(12) United States Patent
Manson (10) Patent No.: US 6,204,894 B1
(45) Date of Patent: Mar. 20, 2001

(54) CLIP ATTACHED TO A BAND OF A CATHODE-RAY TUBE

(75) Inventor: Ernest Thomas Manson, Carmel, IN (US)

(73) Assignee: Thomson Licensing S.A., Boulogne Cedex (FR)

( * ) Notice: Subject to any disclaimer, the term of this patent is extended or adjusted under 35 U.S.C. 154(b) by 0 days.

(21) Appl. No.: 09/118,583

(22) Filed: Jul. 17, 1998

(51) Int. Cl.$^7$ .................................................. H04N 5/65
(52) U.S. Cl. ............................................................. 348/821
(58) Field of Search ................................. 348/821, 805, 348/822–825, 836, 787, 789; 313/477 R, 364, 402, 404, 407, 482; 248/231.81, 230.7, 229.16, 316.7

(56) References Cited

U.S. PATENT DOCUMENTS

| | | | |
|---|---|---|---|
| 3,730,990 | * 5/1973 | Miyata et al. | 348/822 |
| 4,021,850 | * 5/1977 | Rogers | 348/821 |
| 5,036,409 | 7/1991 | Kaaden et al. | 360/51 |
| 5,057,929 | * 10/1991 | Hermann | 348/822 |
| 5,181,123 | 1/1993 | Swank | 358/246 |
| 5,347,367 | 9/1994 | Swank | 348/822 |
| 5,448,316 | * 9/1995 | Bongenaar et al. | 348/821 |
| 5,466,984 | * 11/1995 | Gotoh | 313/477 R |
| 5,606,377 | 2/1997 | Swank | 348/821 |

FOREIGN PATENT DOCUMENTS

| | | | |
|---|---|---|---|
| 0500349B1 | 8/1992 | (EP) | H01J/29/00 |
| 0527057B1 | 2/1993 | (EP) | H01J/29/99 |
| 5-174735 | * 7/1993 | (JP) | H01J/29/87 |
| 5-174736 | * 7/1993 | (JP) | H01J/29/87 |
| 11-339694 | * 12/1999 | (JP) | H01J/29/87 |

* cited by examiner

Primary Examiner—Vu Le
(74) Attorney, Agent, or Firm—Joseph S. Tripoli; Harvey D. Fried; Sammy S. Henig (57) ABSTRACT

A cathode-ray tube includes an evacuated envelope having a faceplate panel with a sidewall joined to a funnel. Implosion protection band surrounds at least a portion of the sidewall and is in contact therewith. The band may include at a given location a pair of flair portions. A degaussing coil clip formed by a resilient or spring leaf material includes a pair of gripping tips that engage the band.

12 Claims, 8 Drawing Sheets

CLIP ATTACHED TO A BAND OF A CATHODE-RAY TUBE

The invention relates to a clip attached to a color cathode-ray tube (CRT) and, in particular, to a degaussing coil clip attached to an implosion protection band of the CRT.

BACKGROUND OF THE INVENTION

A CRT is evacuated to a very low pressure and accordingly is subject to the possibility of implosion due to the stresses produced by atmospheric pressure acting on all surfaces of the CRT. This problem has been addressed in the art by providing the CRT with an implosion protection band. Such a band is used to apply a compressive force to the sidewall of a faceplate panel of the CRT to redistribute some of the forces. The redistribution of the forces decreases the probability of an implosion of the tube by minimizing tension in the corners of the panel. An implosion protection band is also beneficial because it improves the impact resistance of the tube. Glass in compression is stronger than glass which is in tension and the band causes compression in the panel areas which otherwise would be in tension. The implosion protection band also provides a convenient structure on which to attach a degaussing coil that is used to remagnetize internal ferromagnetic components of the CRT.

It is known that the earth's magnetic field affects the paths of the three electron beams emitted by a CRT electron gun and may cause what is called "misregister" in a color CRT. A shadow mask having a multiplicity of apertures therethrough is located in proximity to a tricolor color screen of the tube to assure that each of the three electron beams impacts the phosphor element of the proper light emitting color. Thus, for example, the electron beam which is modulated the red information impacts the phosphor element which emits red light. Because the electrons of the beams are charged particles, the earth's magnetic field has an influence on their trajectories which can cause the electrons to impact a phosphor of the improper color, causing misregister, thereby degrading the quality of the image display. For this reason, a magnetic shield, preferably an internal magnetic shield, or IMS, is used within the CRT to act in conjunction with the shadow mask and its frame to shield a substantial portion of the electron beams trajectories from the influence of the earth's magnetic field. The shielding acts in the following way: the external magnetic field realigns the Weiss domains in the ferromagnetic material, creating an induced magnetic field that tends to oppose the action of the external field of the earth which has given rise to it. If the material of the ferromagnetic components, i.e., of the shadow mask, mask frame and the IMS, has high magnetic permeability, the induced field at least partially opposes the external field. Hence, the deleterious effect of the earth's magnetic field is reduced.

For more efficient compensation, the ferromagnetic material of the components has to be de-magnetized with a magnetic field that is provided by the degaussing coil, fixed by appropriate means to the rear of the tube and overlying the ferromagnetic components. Such arrangement is described in, for example, U.S. Pat. No. 5,347,367, in the names of Swank et al., entitled, Cathode-Ray Tube Having Implosion Protection Means With Openings. In the Swank et al., Patent, a plurality of openings are formed in the implosion protection means to support a degaussing coil. It may be desirable to attach the degaussing coil without using such openings. Advantageously, by eliminating the openings, the implosion band may be narrower than when such openings are used.

SUMMARY OF THE INVENTION

A video imaging apparatus embodying an aspect of the invention includes a cathode-ray tube having an evacuated enevelope. The evactuated envelope includes a faceplate panel with a sidewall having a sealing edge joined to a funnel. A shrinkfit implosion protection band formed by a strip of metal encircles the sidewall. The band has a front edge adjacent to a screen of the faceplate, a rear edge remote from the screen and a first portion that is in contact with the sidewall of the panel disposed between the front and rear edges. A coil supporting clip has a first end portion for engaging the front edge and second end portion for engaging the rear edge.

DETAILED DESCRIPTION OF THE PREFERRED EMBODIMENTS

Figure 1:
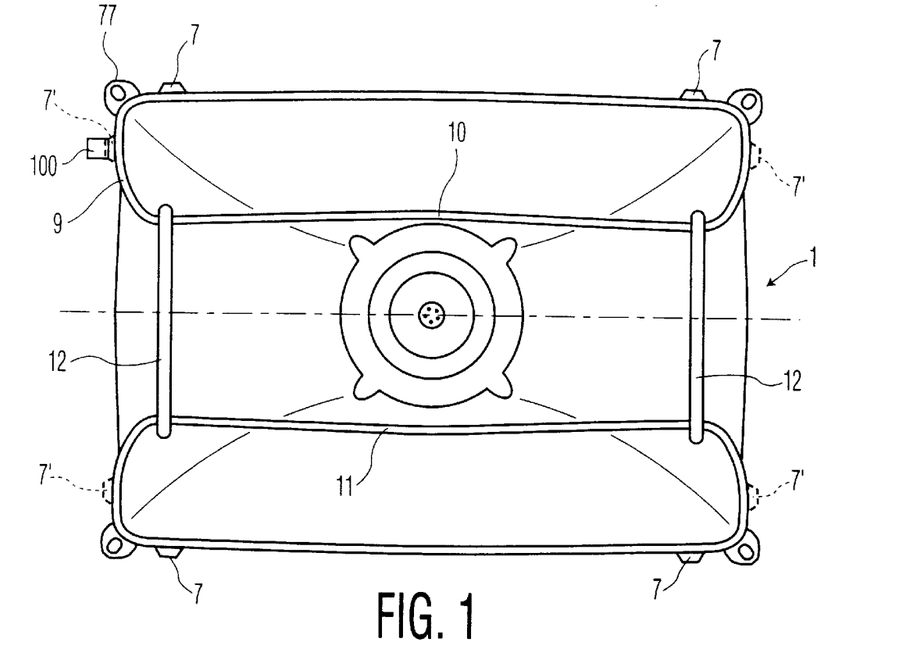
FIG. 1 illustrates a back view of a cathode ray tube and a pair of degaussing coils attached to an implosion protection band by a clip arrangement, in accordance with an inventive feature.
Figure 2:
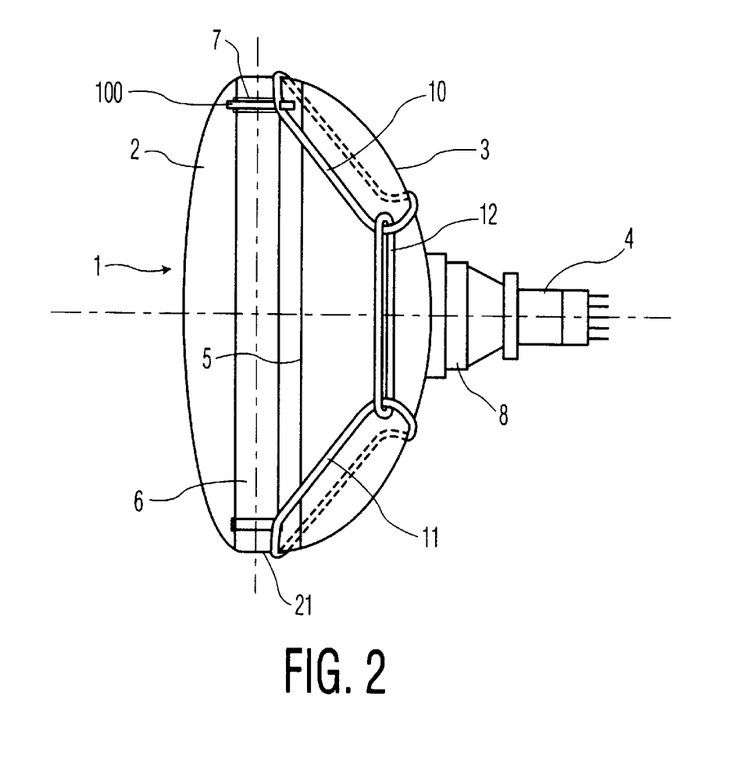
FIG. 2 illustrates a side view of the arrangement of FIG. 1.

FIGS. 1 and 2 illustrate a CRT 1 that includes a glass envelope having a faceplate panel 2 of FIG. 2 and a funnel 3. Similar symbols and numerals in FIGS. 1 and 2 indicate similar items or functions. Funnel 3 of FIG. 2 includes a neck 4. The sidewall of the panel 2 is attached to funnel 3 by a frit seal 5. An implosion protection band 6, embodying an inventive feature, surrounds a skirt 21 of panel 2. Band 6 has four mounting lugs 77 of FIG. 1 located at the four corners of the tube for affixing the tube within a television receiver, not shown. A deflection yoke 8 of FIG. 2 is attached to funnel 3 of CRT 1 to deflect the electron beams from an electron gun (not shown) located in neck 4.

A degaussing coil clip 100, embodying an inventive feature, is clipped to band 6 close to each of four corners of CRT 1. There are, for example, total of four clips 100. Four clips 100 may be placed in corresponding side regions 7'; alternatively, four clips 100 may be placed in corresponding two top regions 7 and two bottom regions 7.

A degaussing coil 9 having two loops 10 and 11 is fixed by appropriate means such as loop 12 to the external surface of funnel 3 of CRT 1. As shown in FIG. 2, coil 9 overlies at least a portion of implosion protection band 6 at the top and bottom of CRT 1.

Implosion protection band 6 is a shrinkfit band with cold dimensions slightly smaller than the periphery of sidewall or skirt 21 of faceplate panel 2. Shrinkfit band 6 is fitted around panel 2 by heating the band within the range of 300 to 500 degree Celsius, causing it to expand, and then allowing it to cool and contact sidewall 21 of the panel. The tension of the cooled band 6 applies a compressive force to the panel.

Figure 3:
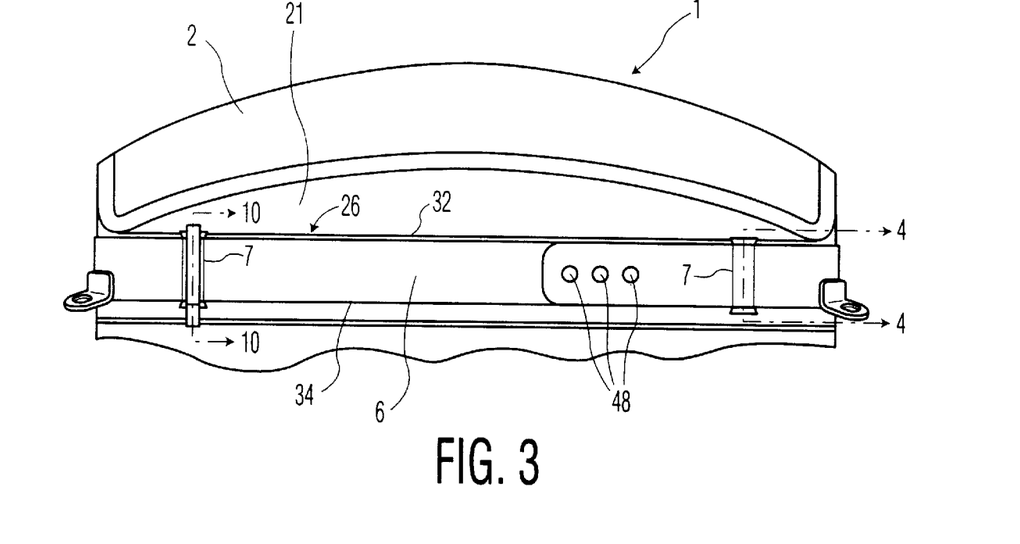
FIG. 3 illustrates a partial top view of the arrangement of FIG. 1.

FIG. 3 illustrates a top view of CRT 1 and a corresponding portion of band 6. Similar symbols and numerals in FIGS. 1, 2 and 3 indicate similar items or functions. For explanation purposes, degaussing coils 9 of FIGS. 1 and 2 are not shown in FIG. 3. Clip 100 is shown in region 7 near the left corner. For explanation purposes, clip 100 is removed from the vicinity of the right corner of CRT 1.

Figure 4:
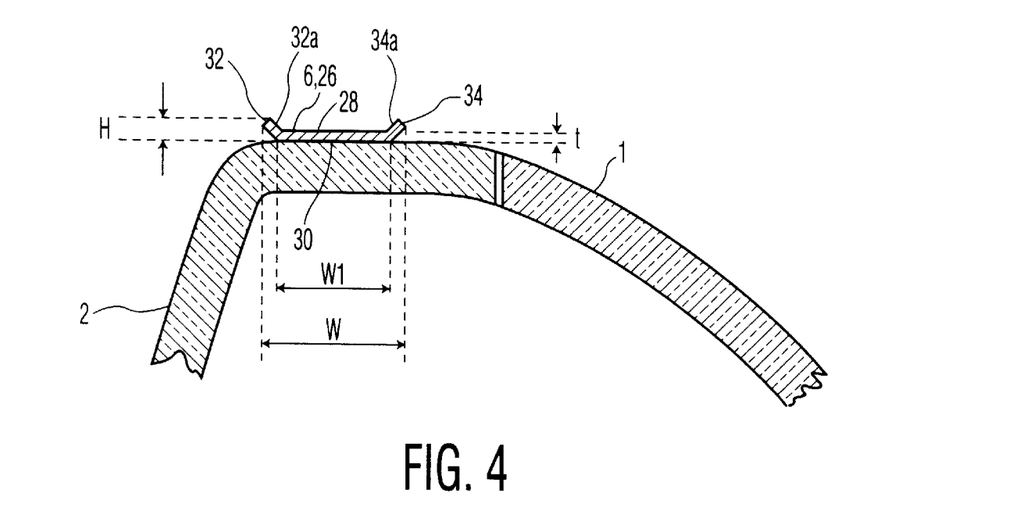
FIG. 4 illustrates a cross section of the band of FIGS. 1 and 2.
Figure 5:
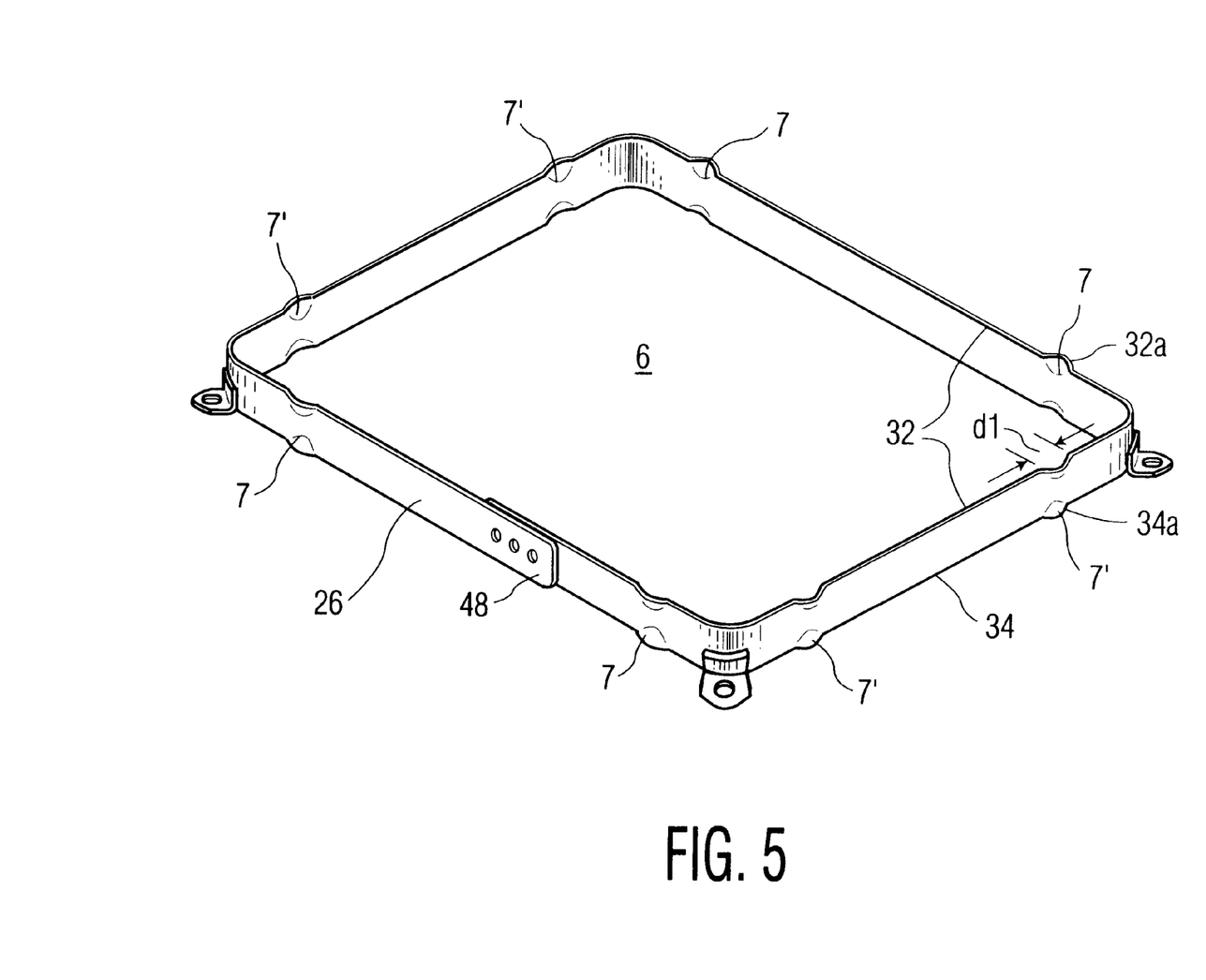
FIG. 5 Illustrates, in perspective view, a first example of the band of FIG. 1 having separated flair portions, in accordance with an inventive feature.

FIG. 4 illustrates, in a cross section, a portion of band 6 in region 7 of FIGS. 1 and 2, adjacent, for example, to the right corner of CRT 1 of FIG. 3, when clip 100 is removed from that location. FIG. 5 Illustrates, in perspective view, a first example of band 6, forming a rectangular shape with curved corners, prior to its installation around panel 2 of CRT 1 of FIG. 3. Similar symbols and numerals in FIGS. 1–5 indicate similar items or functions.

Band 6 of FIG. 4 is formed from a steel strip 26 of FIG. 5. When band 6 of FIG. 4 is placed around CRT 1 of FIG. 1, a surface 30 of band 6 of FIG. 4 is disposed in contact with the surface of skirt 21 of CRT 1 of FIG. 1. An oppositely disposed second surface 28 of FIG. 3 is remote from and is not in contact with the outer surface of CRT 1. The strip has a front edge 32, closer to faceplate 2, and a back edge 34, further from faceplate 2.

In FIG. 5, a portion of edge 32 forms in region 7' a flair portion 32a having a length d1 of, for example, 0.7 inch. Flair portion 32a of FIG. 4 is bent with respect to surface 28 or 30. Similarly, edge 34 includes a flair portion 34a. As explained later on, clip 100 is arranged for gripping flair portions 32a and 34a. A height H of flair portion 32a or 32b of FIG. 4 may be selected in a range between, for example, 0.02" to 0.04".

Figure 6:
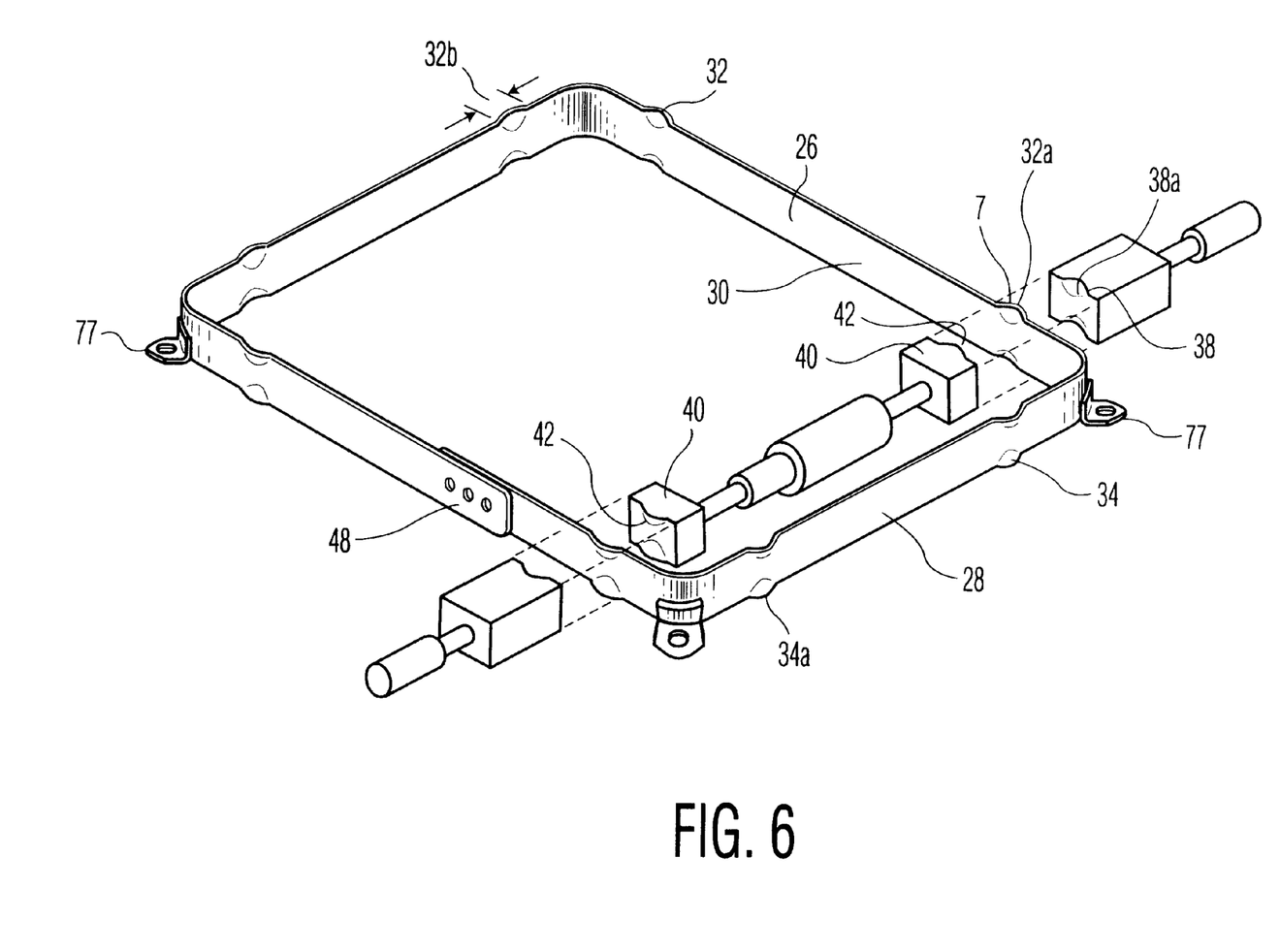
FIG. 6 illustrates a first example of a tool for forming the separated flair portions of FIG. 5.
Figure 7:
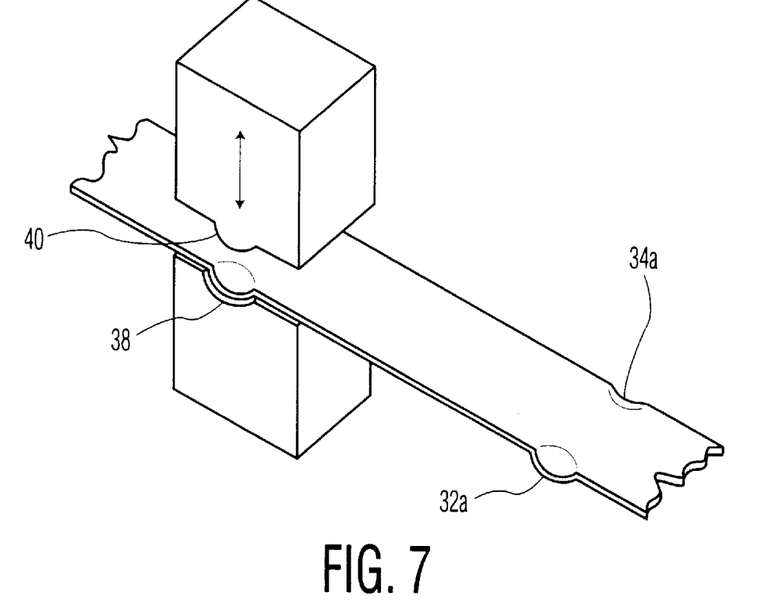
FIG. 7 illustrates a second example of a tool for forming the separated flair portions of FIG. 5.

FIGS. 6 and 7 illustrate a first example and a second example, respectively, of the way individual flair portions 32a and 34a of FIG. 5 are manufactured. Similar symbols and numerals in FIGS. 1–7 indicate similar items or functions. Flair portions 32a and 34a of FIG. 6 can be formed by the same tooling used for bending steel strip 26 to form the rectangular shape with curved corners of band 6 or by the tooling required for welding lugs 77 to band 6.

In the arrangement of FIG. 6, exterior surface 28 of strip 26 is directed toward a forming die 38 and interior surface 30 of the strip is directed toward a punch 40. Punch 40 has a boss 42, with a curved contact area. Die 38 has a channel 38a. Boss 42 is designed to form flair portion 32a by outwardly deforming the portion of band 6 that contacts boss 42. Flair portion 34a is made in a similar way to flair portion 32a. A total number of eight flair portions 34a and eight flair portions 32a are made in a similar way. Only four pairs of oppositely disposed flair portions 34a and 32a may be used for attaching degaussing coil clips. The placements of the four pairs may be selected to be regions 7 or regions 7', as indicated before. Flair portions 32a and 34a of FIG. 7 can be formed in progressive stamping tooling used in processing the band length.

Figure 8:
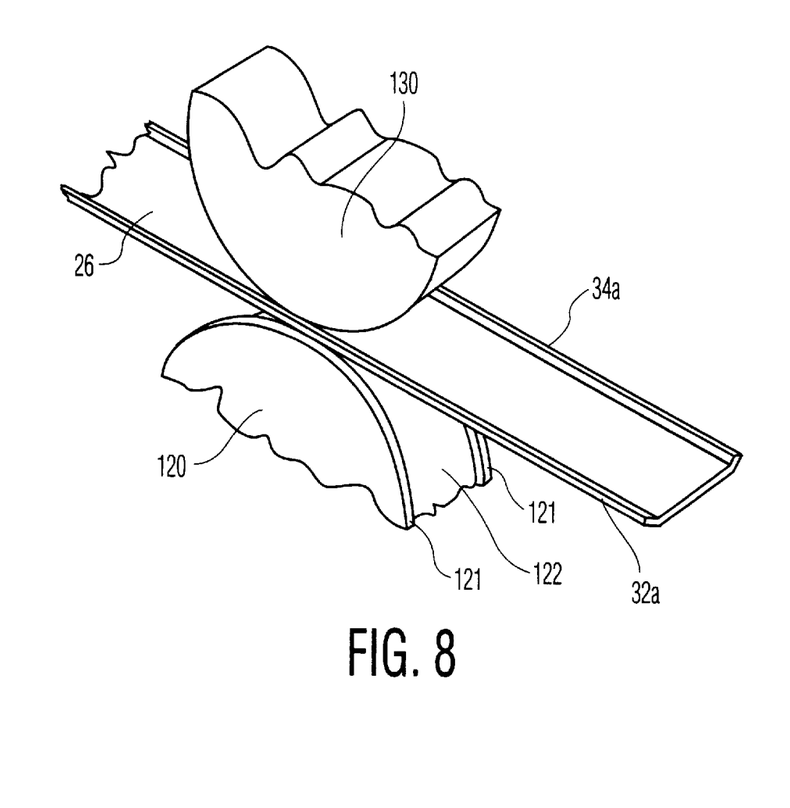
FIG. 8 illustrates a tool for forming a continuous flair portion, embodying an inventive feature, in an alternative band that can be used in the arrangement of FIG. 1.

FIG. 8 demonstrates a second example of the way edges 32 and 34 are bent to form flair edges 32a and 32b. Similar symbols and numerals in FIGS. 1–8 indicate similar items or functions. However, in contrast to the arrangement of FIG. 6, edges 32 and 34 of FIG. 8 are bent to form a continuous flair shape along a substantial portion of the perimeter of band 6, excluding the corner regions. The coil of steel strip 26 is fed between a pair of flair forming rollers 120 and 130. Roller 120 has a channel 122 formed around its area of contact with strip 26. Channel 122 is formed between a pair of upstanding walls 121. Roller 130 applies pressure to strip 26 and bends it against walls 121 of roller 120. Protruding walls 121 press against edges 32 and 34 to form flair portions 32a and 34a. In contrast to the arrangement of FIG. 6, flair portions 32a and 34a of FIG. 8 are not restricted to region 7 or 7'. Instead, they extend around a substantial portion of the entire perimeter of band 6, except at the curved corners which are flattened in the forming operation. Advantageously, flair portions 32a and 34a of FIG. 8 provide greater flexibility in the assembly operation for selecting the locations for installing the clips such as clips 100 of FIG. 1.

The ends of strip 26 are joined together to form a connective joint 48 in band 6 of FIG. 3 which encircles CRT 1. The dimensions of band 6 depend on the size of the CRT 1 to which it is applied. For example, for a CRT having a diagonal dimension of about 79 cm, the overall width W of FIG. 4, of the band is about 38.1 mm. Because flair portions 32a and 34a are not in contact with sidewalls 21 of CRT 1 of FIG. 3, an effective width, W1, of band 6 of FIG. 4, which provides the tension for implosion protection, is smaller than width W and includes only that part of the band that is in actual contact with the sidewall. The band tension, TN, is a function of yield strength, Y; effective width, W1; and thickness, t, (TN=Y·W1·t). An explanation of band design consideration is contained, for example, in U.S. Pat. No. 5,181,123.

Figure 9:
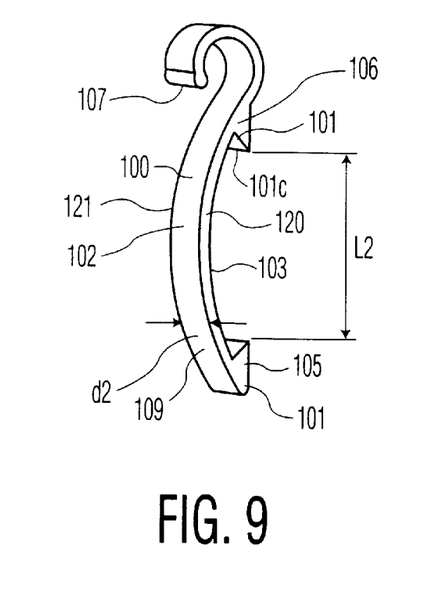
FIG. 9 illustrates, in perspective view, a degaussing coil clip of FIG. 1, embodying an inventive feature.
Figure 10:
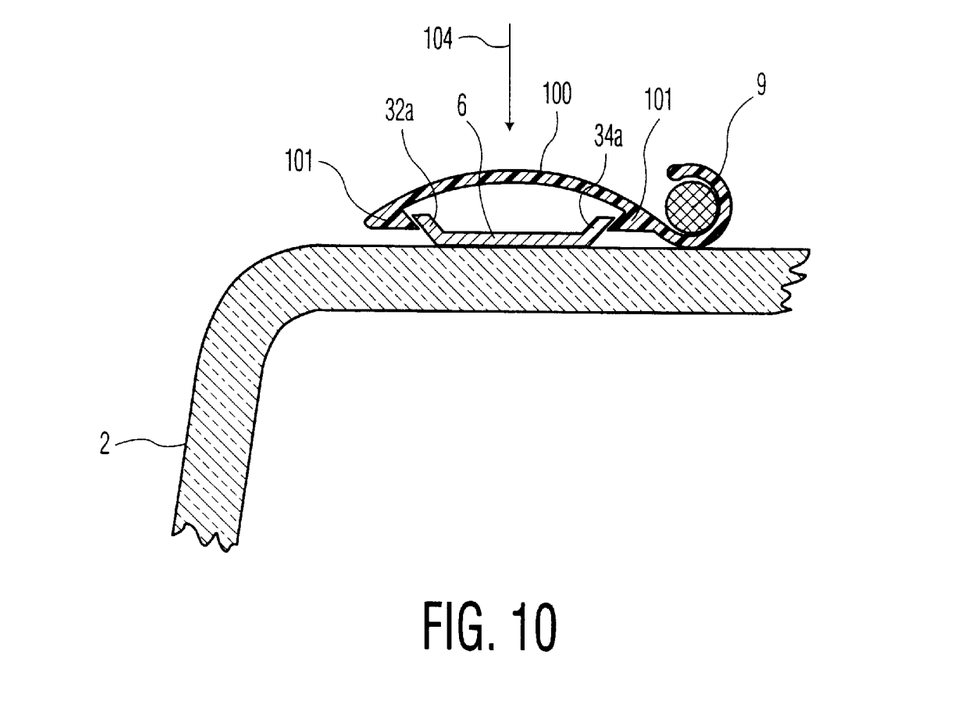
FIG. 10 illustrates, in a cross section, the degaussing coil clip of FIG. 9 engaged to the band of FIG. 4.

FIG. 9 illustrates, in perspective view, degaussing clip 100, embodying an inventive feature, of FIG. 1. FIG. 10 illustrates, in a cross section, a side view of degaussing clip 100 engaging flair portions 32a and 34a. Similar symbols and numerals in FIGS. 1–10 indicate similar items or functions.

Degaussing clip 100 of FIG. 9 is made of an integral piece of resilient material such as plastic. It includes a resilient arcuate portion 102 having a concave top 109 and a convex bottom 103. A width d2 of clip 100 at concave top 109 is, for example, 0.25". Arcuate portion 102 forms a leaf spring. Arcuate portion 102 is formed integrally with a pair of gripping tips 101, formed at an end 105 and at an end 106 of convex side 103 of arcuate portion 102. Gripping tip 101 has a taper shape forming a wedge. When clip 100 is not flexed, prior to engaging band 6 of FIG. 1, a distance L2 of FIG. 9 between gripping tips 101 is, for example, 1.22". Distance L2 of 1.22" fits band 6 of FIG. 4 having width W of 1.375". Distance L2 varies along an edge 101c, as explained later on. Gripping tip 101 of FIG. 10 forms a wedge disposed between a side of flair portion 32a or 34a that is close to CRT 1 and the glass of CRT 1.

For engaging flair portions 32a and 34a, clip 100 of FIG. 9 is placed perpendicularly to band 6 of FIG. 3. Resilient arcuate portion 102 of FIG. 10 is flexed by pressing it in the direction of arrow 104. Thereby, distance L2 of FIG. 9 between gripping tips 101 increases, such that flair portions 32a and 32b of FIG. 10 are interposed between gripping tips 101. Then, the flexing pressure is removed and distance L2 of FIG. 9 decreases. Consequently, gripping tips 101 of FIG. 10 penetrate between flair portions 32a and 34b and the glass of CRT 1. Thereafter, clip 100 remains resiliently engaged to band 6.

From end 106 of arcuate portion 102 of FIG. 9 to an end 107 of clip 100, clip 100 is shaped similarly to the top half of the letter S. That portion forms a resilient open loop for resiliently gripping and holding degaussing coil 9 of FIG. 10 by a leaf spring action.

Figure 11:
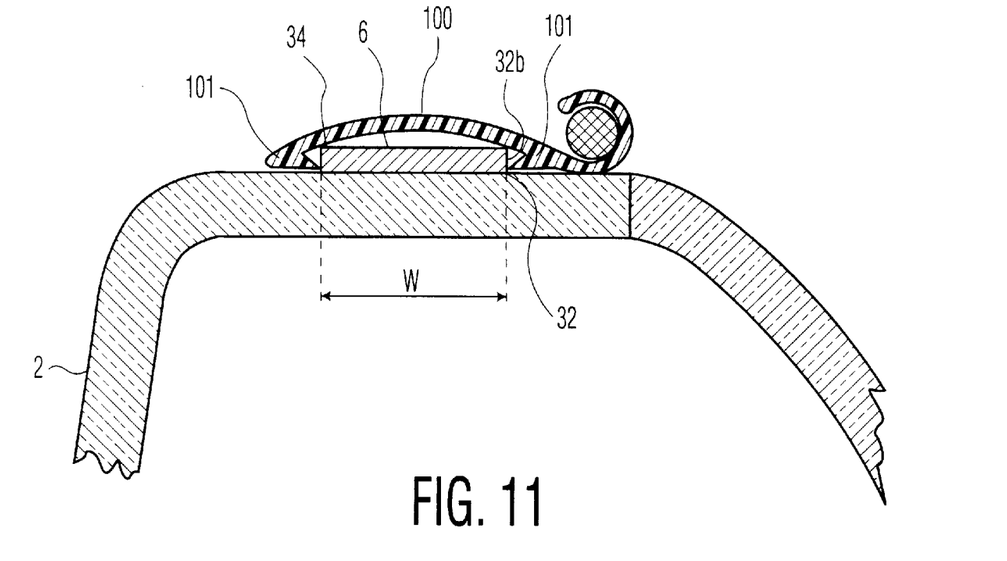
FIG. 11 illustrates, in a cross section, the degaussing coil clip of FIG. 9 engaging a band without any flair portion.

FIG. 11 illustrates, in a cross section, a side view of degaussing clip 100 of FIG. 9 or 10. In contrast to the arrangement of FIG. 9 or 10, clip 100 of FIG. 11 engages a third embodiment of band 6 lacking any of flair portion such as portions 32a and 34a of FIG. 9. Similar symbols and numerals in FIGS. 1–11 indicate similar items or functions.

In the arrangement of FIG. 11, gripping tip 101 of clip 100 grips, for example, an end 32b of edge 32 or may hold band 6 close to the region where edge 32 makes contact with the glass of CRT 1. Advantageously, the arrangement of FIG. 11 provides a larger contact area for a given width W of band 6.

Figure 12:
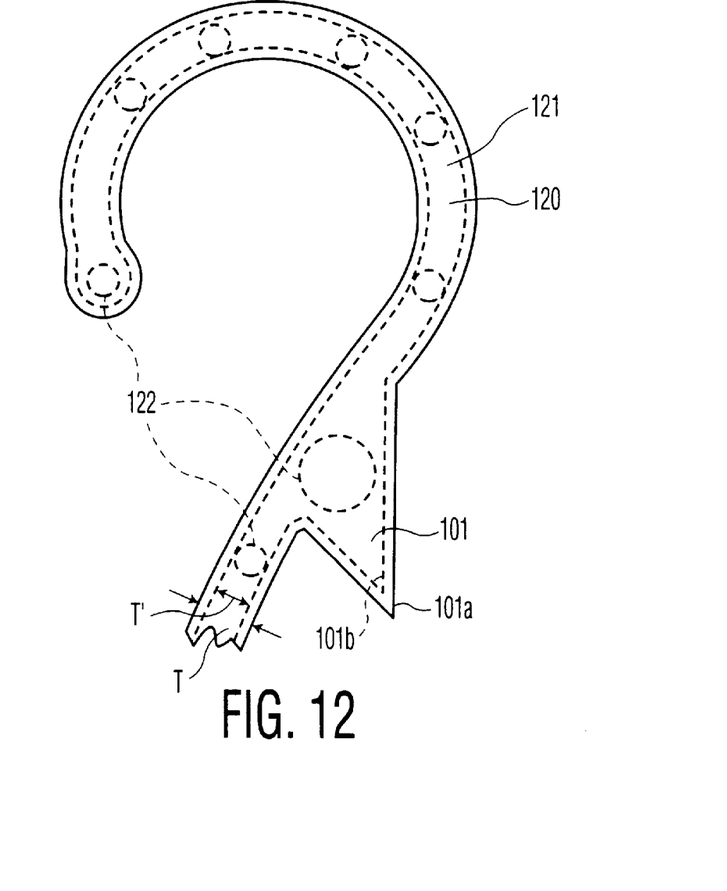
FIG. 12 illustrates a partial side view of the clip of FIG. 9.

FIG. 12 illustrates a partial side view of clip 100 of FIG. 9. Similar symbols and numerals in FIGS. 1–12 indicate similar items or functions. A side 120 of clip 100 of FIG. 12 is shown in solid line and a side 121 of clip 100 is shown in broken line. The side walls of the molding tool, not shown, for making clip 100, is made in such a way that a thickness T of clip 100 measured on side 120 is slightly larger than a thickness T' measured on side 121. Thicknesses T is made greater than thickness T' in order to form a release draft angle for releasing clip 100 from its molding tool. During the molding process, after the plastic material solidifies, clip 100 is pressed from the mold by pins, not shown, that engage thinner side 121. The location of the pins is shown in broken circles 122. As a result, edge portion 101a of tip 101 in side 120 extends further than an edge portion 101b in side 121.

Figure 13A:
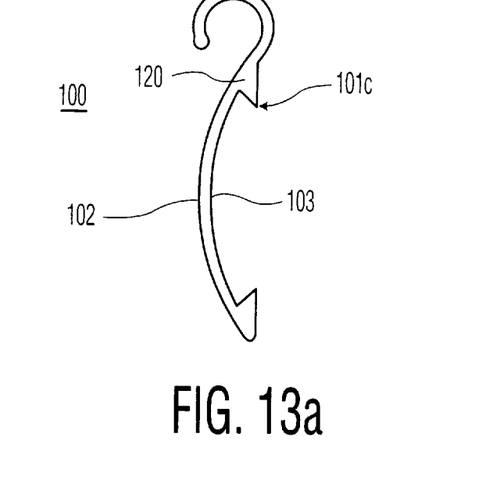
FIGS. 13a, 13b and 13c illustrate a side view, a rear view and a cross section view, respectively, of the clip of FIG. 9, having a gripping tip portion with a slanted edge.
Figure 13B:
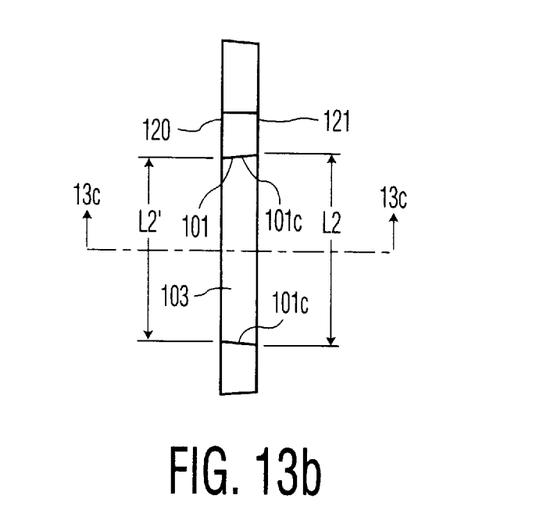
Figure 13C:
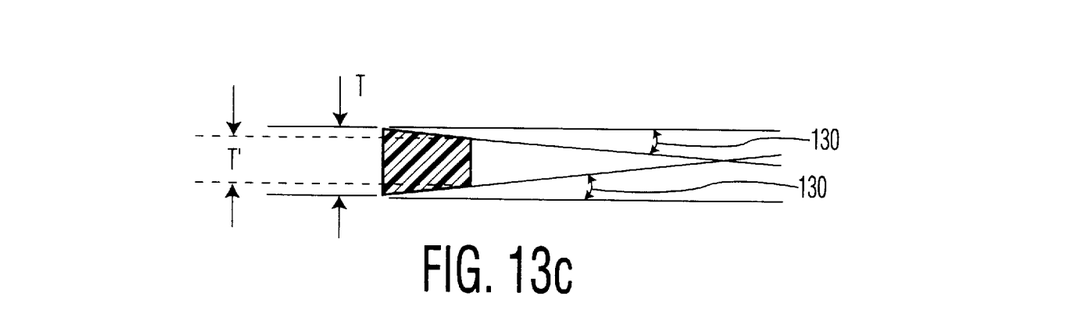

FIGS. 13a, 13c and 13c illustrate the effect of the thickness difference T–T' of FIG. 12 on the shape of tip 101 of clip 100 of FIGS. 13a, 13c and 13c. Similar symbols and numerals in FIGS. 1–2, 13a, 13c and 13c indicate similar items or functions. FIG. 13a illustrates a side view and FIG. 13c illustrates a bottom view of clip 100. FIG. 13c illustrates a cross section in a plane 13c—13c of FIG. 13c. The difference in thickness T–T' of FIG. 13c is such that a release draft angle 130 is in the range of 0.25 to 1.5 degrees. The difference in thickness T–T' produces gripping edge 101c of tip 101 of FIG. 13c that is slanted. Consequently, distance L2' between the portions of tips 101 in side 120 is shorter than distance L2 between the portions of tips 101 in side 121. Advantageously, because gripping edge 101c is slanted, each gripping edge 101c contacts band 6 of FIG. 10 mainly in the portion of edge 101c in side 120 of FIG. 13c and not along the entire length of edge 101c. Therefore, advantageously, a tighter grip of band 6 of FIG. 10 is obtained.

What is claimed is:

1. A video imaging apparatus, comprising:
    a cathode-ray tube including an evacuated envelope, said evacuated envelope including a faceplate panel with a sidewall having a sealing edge joined to a funnel;
    a shrinkfit implosion protection band formed by a strip of metal encircling said sidewall, said band having a front edge adjacent to a screen of said faceplate, a rear edge remote from said screen and a first side portion that is in contact with said sidewall of said panel disposed between said front and rear edges; and
    a coil supporting clip having a pair of gripping tips and a spring leaf portion disposed between said pair of gripping tips for resiliently engaging said tips to said front and rear edges respectively.

2. A video imaging apparatus according to claim 1 wherein said leaf spring portion is arcuate.

3. A video imaging apparatus according to claim 1 wherein at least one of said gripping tips has a slanted edge such that a contact between said edge of said tip and said band is made along a portion of said slanted edge.

4. A video imaging apparatus according to claim 1 wherein a thickness of said clip between a pair of sides of said clip varies to provide for a release draft angle and to form a slanted edge portion at said gripping tip.

5. A video imaging apparatus according to claim 1 wherein said clip includes a hook portion for supporting a degaussing coil.

6. A video imaging apparatus, comprising; a cathode-ray tube including an evacuated envelope, said evacuated envelope including a faceplate panel with a sidewall having a sealing edge joined to a funnel;
    a shrinkfit implosion protection band formed by a strip of metal encircling said sidewall, said band having a front edge adjacent to a screen of said faceplate, a rear edge remote from said screen and a first side portion that is in contact with said sidewall of said panel disposed between said front and rear edges; said band including a first flair portion spaced away from said sidewall and extending between said first side portion of said band and one of said edges; and
    a coil supporting clip having a first end portion for engaging said front end and a second end portion for engaging said rear edge, said clip including a first gripping tip disposed between said first flair portion of said band and said sidewall.

7. A video imaging apparatus according to claim 6, wherein said band further includes a second flair portion opposite said first flare portion, spaced away from sidewall and extending between said first side portion of said band and the other one of said edges and wherein said clip further includes a second gripping tip disposed between said second flair portion of said band and said sidewall.

8. A video imaging apparatus according to claim 7 wherein said band includes a plurality of pairs of said first and second pair portions, and wherein a given pair of said first and second flair portions is separated from an adjacent pair of said first and second flair portions such that a portion of said band separating said given and adjacent pairs is formed without a flair portion.

9. A video imaging apparatus according to claim 7 wherein a given one of said flair portions is formed continuously along a substantial portion of a perimeter of said band.

10. A video imaging apparatus, comprising:
    a cathode-ray tube including an evacuated envelope, said evacuated envelope including a faceplate panel with a sidewall having a sealing edge joined to a funnel; and
    a shrinkfit implosion protection band formed by a strip of metal encircling said sidewall, said band having a front edge adjacent to a screen of said faceplate, a rear edge remote from said screen and a first side portion disposed between said edges and in contact with said sidewall of said panel, said band including a pair of flair portions, spaced away from said sidewall and extending between said first side portion and said edges, respectively.

11. A video imaging apparatus according to claim 10 wherein said clip has a first gripping tip disposed between one of said flair portions and said sidewall and a second gripping tip disposed between the other one of said flair portions and said sidewall.

12. A video imaging apparatus according to claim 10, further comprising a coil supporting clip attached to said pair of flair portions.

* * * * *